Sept. 24, 1963 L. D. GILL Re. 25,449

BOX WITH SELF LOCKING TAB

Original Filed June 3, 1959

INVENTOR.

Lester D. Gill

BY Emery, Whittemore, Sandoe & Graham

ATTORNEYS

United States Patent Office

Re. 25,449

Reissued Sept. 24, 1963

25,449

BOX WITH SELF LOCKING TAB

Lester D. Gill, 302 North Road, Butler, N.J.

Original No. 2,979,249, dated Apr. 11, 1961, Ser. No. 817,916, June 3, 1959. Application for reissue June 28, 1962, Ser. No. 207,452

12 Claims. (Cl. 229—17)

Matter enclosed in heavy brackets [ ] appears in the original patent but forms no part of this reissue specification; matter printed in italics indicates the additions made by reissue.

This invention relates to containers in which soap powders, other granular materials and liquids are sold. Such containers are opened to discharge part of the contents, but usually only a part of the contents are used at any one time and it is desirable to provide means for closing the opening after each use of the container for discharging some of the contents. It is an object of the invention to provide an improved closure for such containers and more especially to provide a simple and inexpensive closure which locks in closed position so that the contents of the container do not spill if the container is accidentally overturned.

It is a more particular object of the invention to provide a container having one end closed by flaps or panels which are attached to the side walls of the container and folded over on one another. The invention provides a tab which can be pulled up to uncover a discharge opening, and the edges around the opening at the different panels correlated and overlapped so as to obtain the desired locking effect when the closure tab is pushed into position to cover the discharge opening.

Other objects, features and advantages of the invention will appear or be pointed out as the description proceeds.

In the drawing, forming a part hereof, in which like reference characters indicate corresponding parts in all the views.

Figure 1:
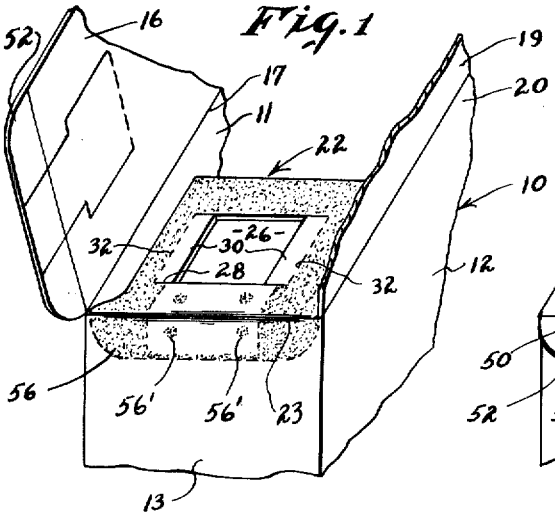
FIGURE 1 is a fragmentary, perspective view showing one corner of a box or container made in accordance with this invention and with only one of the panels in closed position.

FIGURE 1 shows a container or box 10 having side walls 11 and 12 connected to opposite edges of an end wall 13. A middle panel 16 is hinged to the upper edge of the side wall 11 along a score line 17. A top panel 19 is hinged to the upper edge of the side wall 12 along a score line 20; and a lower panel 22 is hinged to the upper edge of the end wall 13 along a score line 23.

The lower panel 22 is a flap which extends for only part of the length of the upper end of the box and usually for less than the full width of the box. The middle and top panels 16 and 19, respectively, are as long as the box and preferably extend for the full width of the box between the side walls 11 and 12.

There is an opening 26 through the lower panel 22. In making this opening, the material of the panel 22 is cut along lines 28 which extend beyond the side edges of the opening 26 on both sides of the opening. This leaves a short flap 30 on both sides of the opening 26 and these flaps 30 can flex about the dotted lines 32, and they serve as a brake on both sides of the opening, to prevent the panel 44 from pushing in beyond the inner panel 22.

Figure 2:
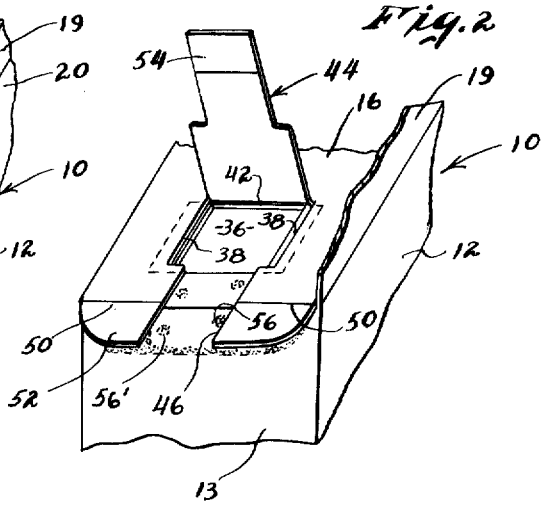
FIGURE 2 is a view similar to FIGURE 1 but with the middle panel of the top folded down into closed position and with the closure tab in open position.

The middle panel 16 has an opening 36 which is in substantial alignment with the opening 26 of the lower panel 22 when the middle panel 16 is folded down on the lower panel 22, as shown in FIGURE 2. The opening 36 is slightly wider than the opening 26 and has side edges 38 which are spaced back a slight distance from the edges of the flaps 30 of the lower panel 22.

The material displaced from the middle panel 16 to produce the opening 36 is left connected to the middle panel along a hinge line 42; and this displaced material forms a closure flap 44.

Figure 3:
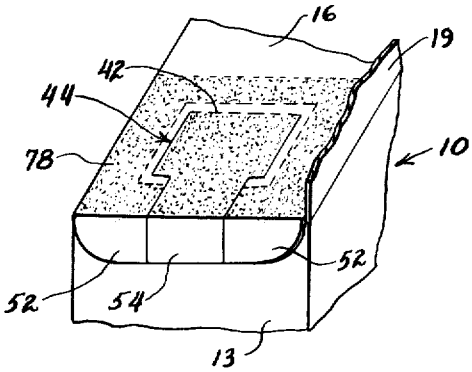
FIGURE 3 is a view similar to FIGURES 1 and 2 but with the closure tab in closed position.

The closure flap 44 is severed from the middle panel 16 along a slot 46 which extends from the opening 36 to the end of the middle panel 16. The portion of the panel 16 which extends beyond the end wall 13 is bent downwardly along line 50 to form tabs 52 which are secured to the end wall of the box 10, as shown in FIGURE 3. When the closure flap 44 is in closed position, as shown in FIGURE 3, an end tab 54 of the closure flap is bent down over the end wall 13 and preferably glued to the end wall.

Adhesive 56 for bonding the middle panel 16 to the lower panel 22, and for bonding the tabs 52 and 54 to the end wall 13, is most clearly shown in FIGURE 1. In the preferred construction, ink or other material is applied to portions of the box blank, before applying the adhesive so that no adhesive sticks to certain areas of the blank. For example, there is no adhesive on the flaps 30 and there are only a few spots of adhesive under the tab 54 and the portion of the closure flap 44 which connects this tab with the remainder of the closure flap. These spots of adhesive hold the closure flap 44, including its tab 54, in place when the box is shipped and before it has been opened; but the adhesive spots 56' are spaced from the edge of the flap 54 so that a thumbnail or other means can be inserted under the flap 54 to pull it loose from the end wall of the box and to provide a gripping area for lifting the closure flap 44 when initially opening the box.

Figure 4:
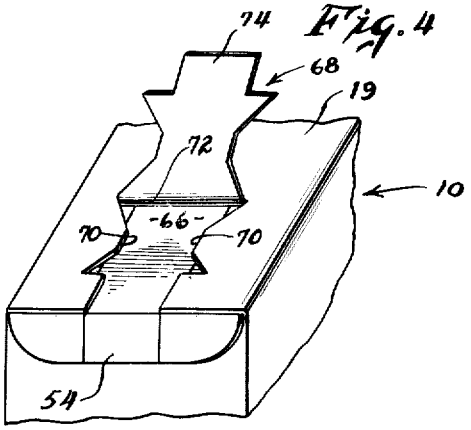
FIGURE 4 is a similar view to FIGURES 1–3 but with all the panels folded down and the closure tab open.
Figure 5:
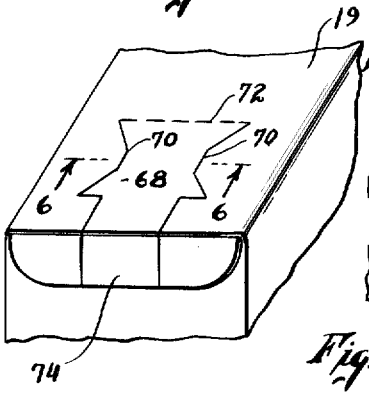
FIGURE 5 is a view similar to FIGURE 4 but with the closure tab in closed position.
Figure 8:
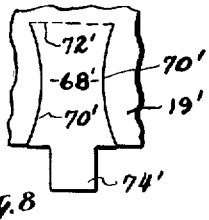
FIGURE 8 is a top plan view showing a modified shape for the opening through the top panel of the box.

The top panel 19 has an opening 66 in general alignment with the openings 26 and 36 when the top panel 19 is folded down on the underlying panels, as shown in FIGURE 4. This opening 66 is formed by displacing material of a flap 68 from the top panel 19. The opening 66 has side edges 70, and along at least a part of the length of the opening 66, these side edges 70 are spaced apart by a distance less than the width of the opening between the edges 38 of the opening through the middle panel. In the construction illustrated, the side edges of the opening 66 are shaped so as to be further apart toward both ends of the opening than they are at the middle. In FIGURES 4 and 5, the side edges of the opening 66 are shown as broken lines, but FIGURE 8 shows a modified construction in which these broken lines are replaced by arcuate edges 70'. Other parts in FIGURE 8, corresponding to the construction of FIGURES 4 and 5, are shown by the same reference characters with a prime appended.

The flap 68 (FIGURES 4 and 5) is connected with the top panel 19 along a hinge line 72, and it has a tab 74 which extends over the corresponding portion of the closure flap 44 located below it.

The top panel 19 is secured to areas of the middle panel 16 by adhesive 78, shown as stippling in FIGURE 3, and this adhesive terminates some distance back from the edges of the closure panel 44 so that the edge portions of the panel 19 around the opening 66 (FIGURE 4) are not secured to the middle panel and can move with respect to the middle panel when the edge portions of the aligned openings through the box top are flexed downwardly or upwardly.

Figure 6:
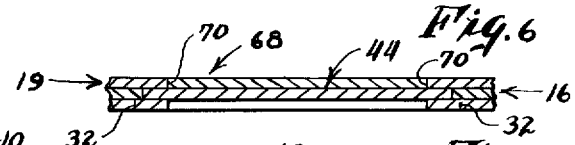
FIGURE 6 is an enlarged sectional view taken on the line 6—6 of FIGURE 5.
Figure 7:
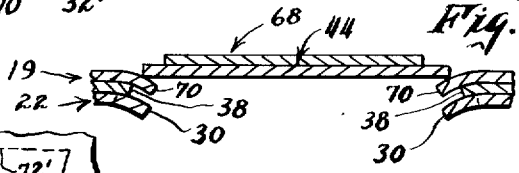
FIGURE 7 is a view similar to FIGURE 6 but with the parts in different positions.

The principle of operation of the invention is best shown in FIGURES 6 and 7. Before opening of the box, the panels 16, 19 and 22, and the flaps 44 and 68 are in the relation shown in FIGURE 6. This provides a secure seal for the box. It is not necessary that the various openings through the panels 16, 19 and 22 align with one another accurately. Considerable tolerance in the alignment produces no injurious effect nor does it change the operation of the invention.

From FIGURE 6 it will be evident that when the top panel 19 is folded down on top of the middle panel 16, the edges 70 of the top panel overlie the edge portions of the flap 44 of the middle panel 16 to hold the closure flap 44 in closed position.

The closure flap 44 is pulled open by first pulling the tab 54 (FIGURES 2 and 3) loose from the adhesive spots 56', and then pulling the closure flap 44 into the raised positions shown in FIGURE 2. This, of course, lifts the flap 68 of the top panel 19.

After some of the contents of the box have been emptied out for the particular use desired, the closure flap of the box is pushed down again into the box as shown in FIGURE 7. Since the closure flap 44 is wider than the spacing of the edges 70, it cannot pass between these edges without deflecting them downwardly to increase the effective width of the opening. FIGURE 7 shows the edge portions of the different openings through the panels bending downwardly in response to pressure of the closure flap 44 as it is pushed into position to reclose the box. The fact that the edge portions of the openings through the different panels are not glued together permits them to move over one another as they bend downwardly and avoids the three-ply stiffness which would be present in the construction if these edge portions were glued together.

If the closure flap 44 is pushed down further than the position shown in FIGURE 7, the edges 70 bend far enough to permit passage of the closure flap, and the closure flap itself can bow transversely to some extent to permit it to pass between the side edges 70 of the opening through the top panel 19. As soon as the edges of the closure flap 44 snap past the edges 70, further downward pressure on the closure flap 44 can be released, and the stiffness of the cardboard material, of which the box panels are preferably constructed, causes the edges of the openings through the panels to again move upwardly to restore the parts to substantially the same positions as shown in FIGURE 6.

Thus, the edge portions of the closure flap 44 lock between the portions of the top panel 19 adjacent to the edges 70; and the closure flap 44 is supported from below by the flaps 30 of the lower panel 22. It is not necessary that the flaps 30 return to a completely horizontal position, or that the portions of the top panel 19 behind the edges 70 flatten out completely. The closure flap 44 will lock into closed position even though the original condition shown in FIGURE 6 is only partially restored. This result is made possible by the fact that the side edges of the closure flap 44 extend for a substantial distance under and back from the edges 70 of the openings through the top panel 19. This substantial extent of the closure flap 44 under the side edges of the top opening has the further advantage of permitting the closure flap to lock securely in place even though the openings through the respective panels are imperfectly aligned.

The preferred construction of the invention has been illustrated and described, but changes and modifications can be made and some features can be used in different combinations without departing from the invention as defined in the claims.

What is claimed is:

1. A container having a wall made of a plurality of panels including a top panel and a second *panel* located under the top panel, both of the *top and second* panels having openings therethrough and each of the *top and second* panels having a [flap] *smaller panel* formed of material displaced from the opening [but] *and at least one of the smaller panels being* connected *along a hinge line* to the panel [along a] *from which it is displaced,* the hinge line *being* at the rearward end of the opening, the openings being in at least approximate alignment with one another and forming a discharge outlet for the container, the [flaps] *smaller panels* [being secured together to] form*ing* a [multi-ply] closure for the discharge outlet, *at least one of* the side edges of the opening in the top panel extending inward beyond and overlapping the *corresponding* side [edges] *edge* of the opening through the second panel for a portion of the length of said discharge outlet, the overlapping side [edges] *edge* terminating at least at this hinge line and being of short overlapping [dimensions] *dimension* whereby the closure formed by said [flaps] *smaller panels* clears the overlapping side [edges] *edge* when moved into its open position, the overlapping [edges] *edge* being below the closure and being depressed thereby into locking [positions] *position* when the closure is moved toward its closed position, and adhesive securing the *top and second* panels together beyond the openings.

2. The container described in claim 1 and in which the opening through the second panel is wider than the opening through the top panel at some places and narrower than the opening through the top panel at other places whereby the closure contacts with the top surface of the second panel along the edge portions of the opening through the second panel where that opening is narrower.

3. The container described in claim 1 and in which *there is* [the] adhesive securing the *top and second* panels together *and the adhesive* does not extend all the way to the edges of the openings through the *top and second* panels and the edge portions of the openings are free to move over one another when they are displaced downwardly and upwardly.

4. The container described in claim 2 and in which the side edges of the opening in the top panel converge toward one another toward a mid region intermediate the ends of the opening, and the side edges of the opening through the second panel extend along straight lines.

5. The container described in claim 2 and in which the side edges of the opening through the top panel converge toward one another from both ends of that opening and along broken lines.

6. The container described in claim 2 and in which the side edges of the opening through the top panel converge toward one another from both ends of that opening along gradually curved lines.

7. The container described in claim 1 and in which the container has a lower panel under the second panel and there is an opening through the lower panel in at least approximate alignment with the openings through the [other] *top and second* panels, and the side edge portions of the opening through the lower panel extend inwardly beyond the side edges of the opening through the second panel for at least a portion of the length of the side edges of said opening through the second panel, *and on at least one side of the opening.*

8. The container described in claim 7 and in which the side edge portions of the opening through the lower panel are severed from the lower panel at both ends of that opening and from flaps connected to the lower panel along regions back from the side edges of said opening in the lower panel at which regions the flaps yield downwardly when the closure is pushed downward to close the container.

9. The container described in claim 8 and in which the lower panel is connected to the underside of the second panel but the edge portions of the lower panel that form flaps are free of any connection with the second panel and bend downwardly to form a yielding brake for the closure when it is pushed into closed position.

10. The container described in claim 1 and in which the container is a box having a top wall and other walls including side and end walls, and the top wall is formed by the *top and second* panels, and the openings through the panels are near one of the other walls of the box and a portion of [the flap of] one of the *smaller* panels extends beyond the junction of the top wall and the adjacent other wall and then extends downwardly along said other wall and is detachably secured thereto to provide a pull tab for starting the opening of the closure.

*11. The container described in claim 1 and in which the smaller panels are secured together.*

*12. The container described in claim 1 and in which both of the smaller panels are connected at hinge lines to the panels from which they are displaced.*

References Cited in the file of this patent or the original patent

UNITED STATES PATENTS 2,812,127 Graybill ---------- Nov. 5, 1957